Oct. 29, 1968  G. P. GRANT, JR  3,408,141
DOCUMENT COPYING DEVICE

Filed Sept. 2, 1965  8 Sheets-Sheet 1

INVENTOR.
G. PETER GRANT, JR.
BY Albert F. Kronman
ATTORNEY

FIG. 3

INVENTOR.
G. PETER GRANT, Jr
BY Albert H Kronman
ATTORNEY

FIG. 4

INVENTOR.
G. PETER GRANT, JR.
BY Albert F. Kronman
ATTORNEY

Oct. 29, 1968  G. P. GRANT, JR  3,408,141
DOCUMENT COPYING DEVICE
Filed Sept. 2, 1965  8 Sheets-Sheet 8

INVENTOR.
G. PETER GRANT, JR.
BY
ATTORNEY

United States Patent Office 3,408,141
Patented Oct. 29, 1968

3,408,141
DOCUMENT COPYING DEVICE
G. Peter Grant, Jr., Little Hill, R.F.D. 1,
Warner, N.H. 03278
Filed Sept. 2, 1965, Ser. No. 484,679
13 Claims. (Cl. 355—28)

ABSTRACT OF THE DISCLOSURE

A photographic document copying device in which a single main lens in combination with a mirror system is employed to convert a positive document first into a non-reversed negative copy and thereafter into a non-reversed positive copy of the original. Feed means are provided to convey the exposed sensitized negative and positive material through developing solutions carried within the device.

This invention relates to a copying machine for copying documents of various sizes on sensitized paper. The invention has particular reference to a reproduction machine which can be adjusted to produce copies of various sizes including micro-images used in miniaturizing files of documents. The machine makes enlarged prints of microtape images and is also equipped with a projection system for viewing microtape images. The machine contains its own processing tank containing activator and stabilizer solutions for making photographic reproductions. An alternate arrangement includes a heated platen for fixing thermal process sensitized paper.

There are many copying machines which have been developed for reproducing documents of letter or legal size. The present invention has the additional flexibility of being able to reproduce letter size (8½ x 11) or legal size (8½ x 14) or to make copies of documents which are 71% of the full size, thereby using only half the area of a full sized reproduction. The machine also copies regular letter size and legal size documents onto microtape which reduces the storage space to less than 10% of the space required for the original documents. Another adjustment in the machine permits an operator to reproduce the microtape images.

An object of the present invention is to provide an improved copying machine which avoids one or more of the disadvantages and limitations of prior art machines.

Another object of the present invention is to use a single main lens for all the optical systems.

Another object of the present invention is to provide an adjusting means which is available to an operator for changing the machine to make different sized copies, to project an image, or to make copies of a microtape recording.

Another object of the present invention is to provide a classification means on the microtape film so that an operator may select a desired frame of a microtape image at high speed.

A further object of the present invention is to perform in a single machine all the reproduction functions needed in an office to make copies, to microtape documents and to reproduce microtape documents.

A still further object of the present invention is to provide a small, table-top, fully automatic machine using a single lens which will produce copies, microtape and enlargements from microtape by an adjustment so simple that any unskilled operator can operate.

Another object of the present invention is to provide a machine using a single lens to make copies of documents and to make right reading micro images of documents on paper in strips of variable length so as to preserve the classification under which the documents were originally sorted and to permit the tapes to be filled according to their original classifications.

The machine also includes two sources of illumination for lighting the documents to be copies or projected. A multi-contact switch, under control of an external dial, is provided for switching from one circuit to another to make the necessary adjustments when the optical systems are changed. Other components, such as motors, relays, and paper cutting knives are positioned in the cabinet and their function will be described later.

The invention consists of the construction, combination, and arrangement of parts as herein illustrated, described and claimed.

In the accompanying drawings, forming a part hereof, there is illustrated one form of embodiment of the invention, in which drawings similar reference characters designate corresponding parts, and in which.

Figure 1:
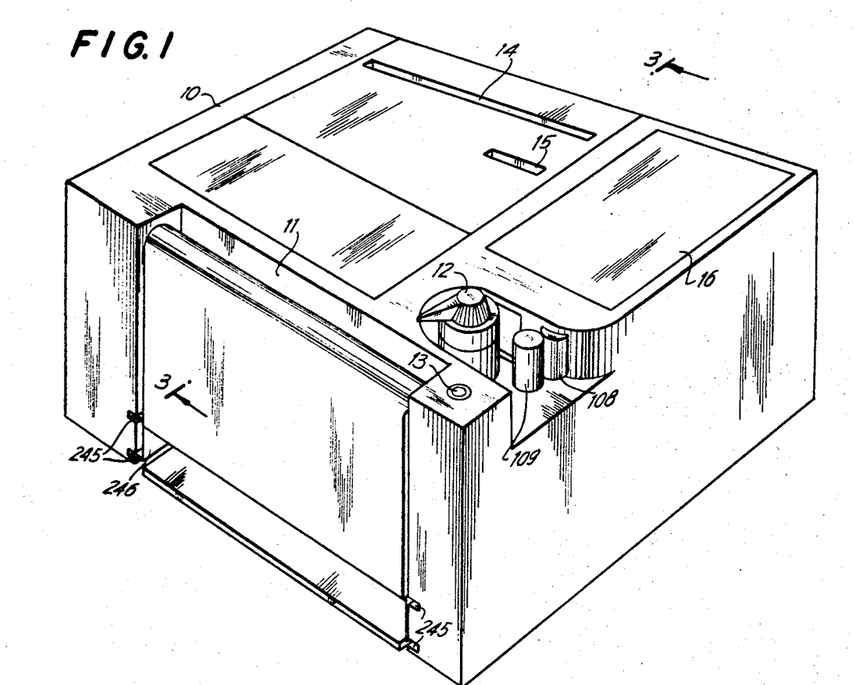
FIGURE 1 is a perspective view of the copying machine.
Figure 2:
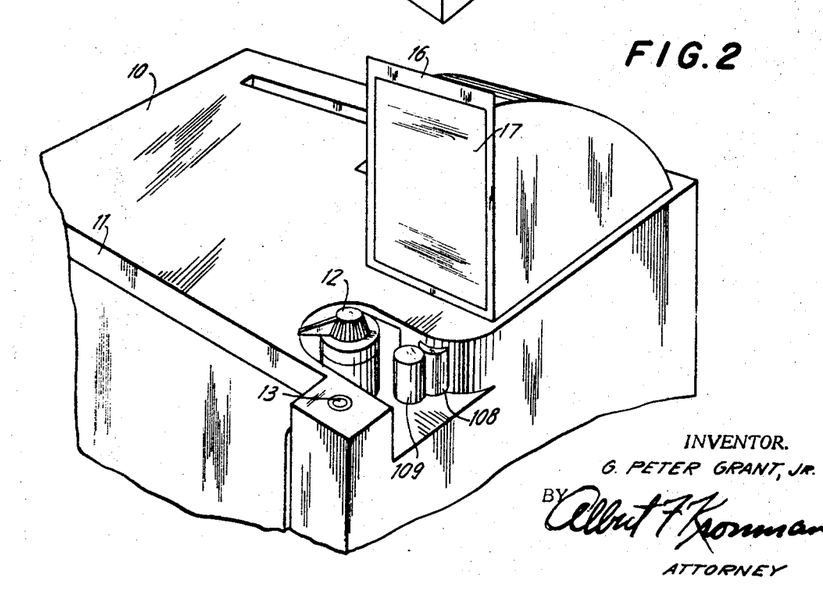
FIGURE 2 is a partial perspective view of the machine shown in FIGURE 1, but with an image projection screen in its raised position.

Referring now to FIGURES 1 and 2, the copying machine includes a cabinet 10, having an entrance slot 11, where documents are entered when they are to be reproduced. A hand knob 12 is available at the top of the machine and is connected to a shaft which turns three dial switches for changing the circuit. Another switch 13 is provided at the top of the machine for starting the operation after the circuit has been selected and the document entered into slot 11. A first delivery slot 14 is provided for delivering the printed and developed reproductions. A second slot 15 is provided for inserting microtape strips when a reproduction is desired from the tape images. A hinged cover 16 contains a projection screen (FIGURE 2) which is raised to view projected microtape pictures.

Figure 3:
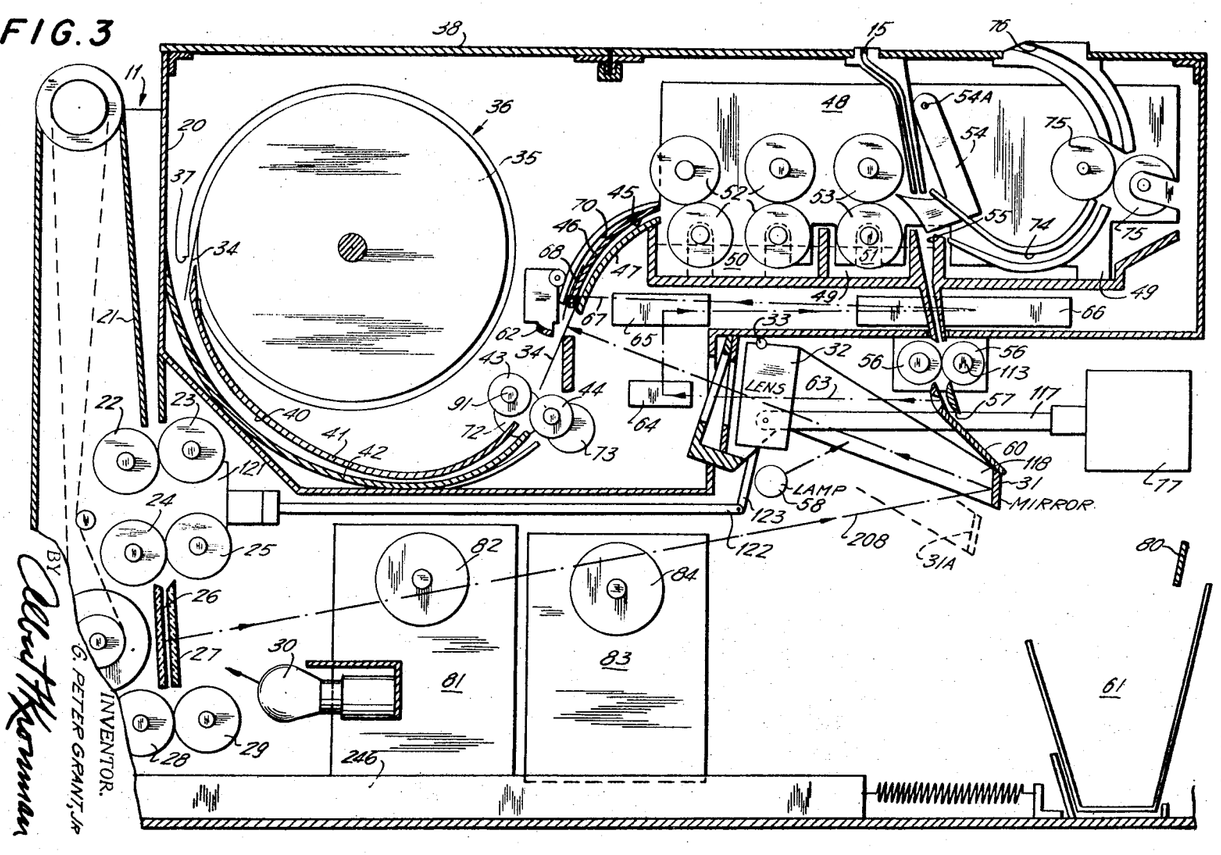
FIGURE 3 is a cross-sectional view of the machine shown in FIGURE 1, and is taken along line 3—3 of that figure. This view shows the major components of the machine including the lens, the roll of sensitized paper, and the processing unit.
Figure 4:
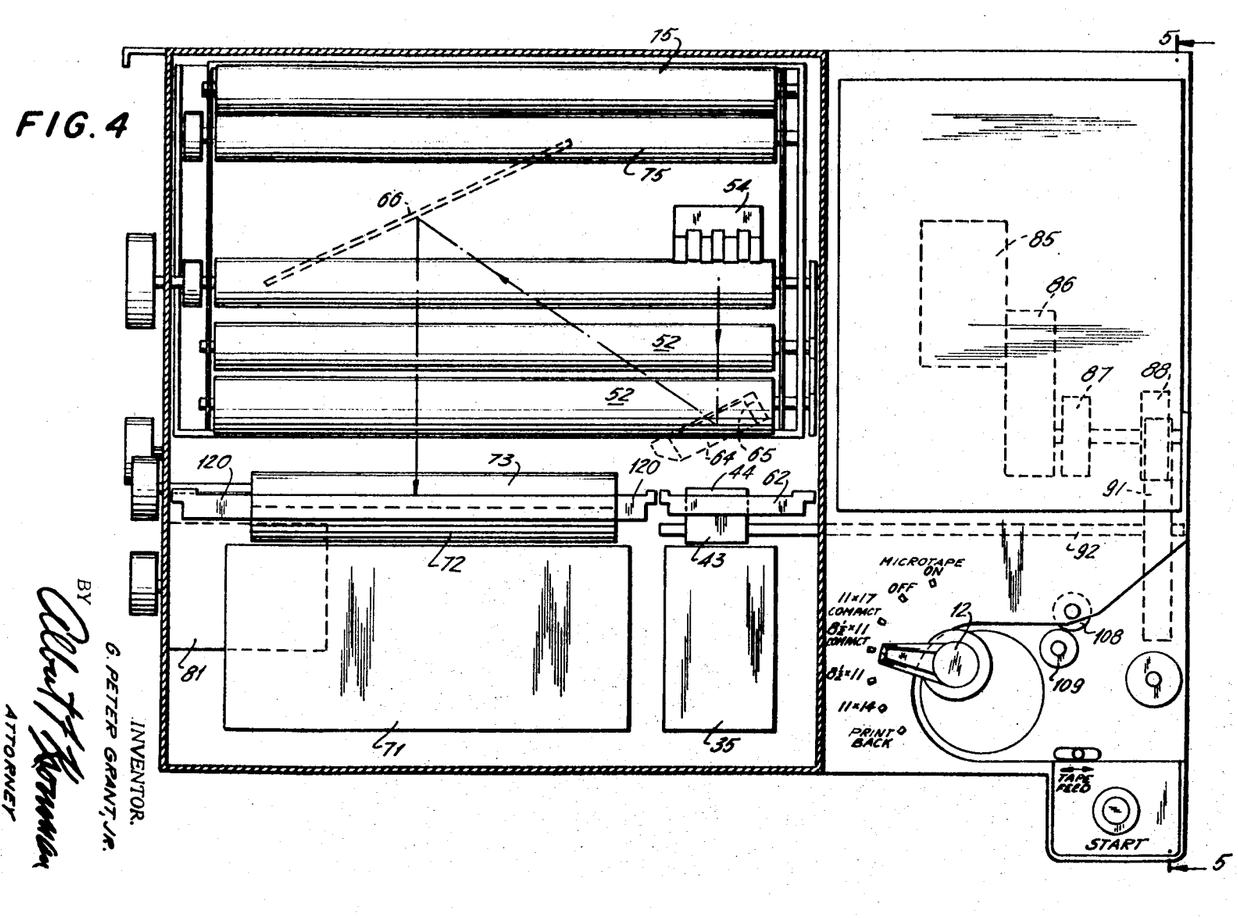
FIGURE 4 is a top view of the machine when two of the lids have been removed to show the paper rollers and the processing tank.
Figure 5:
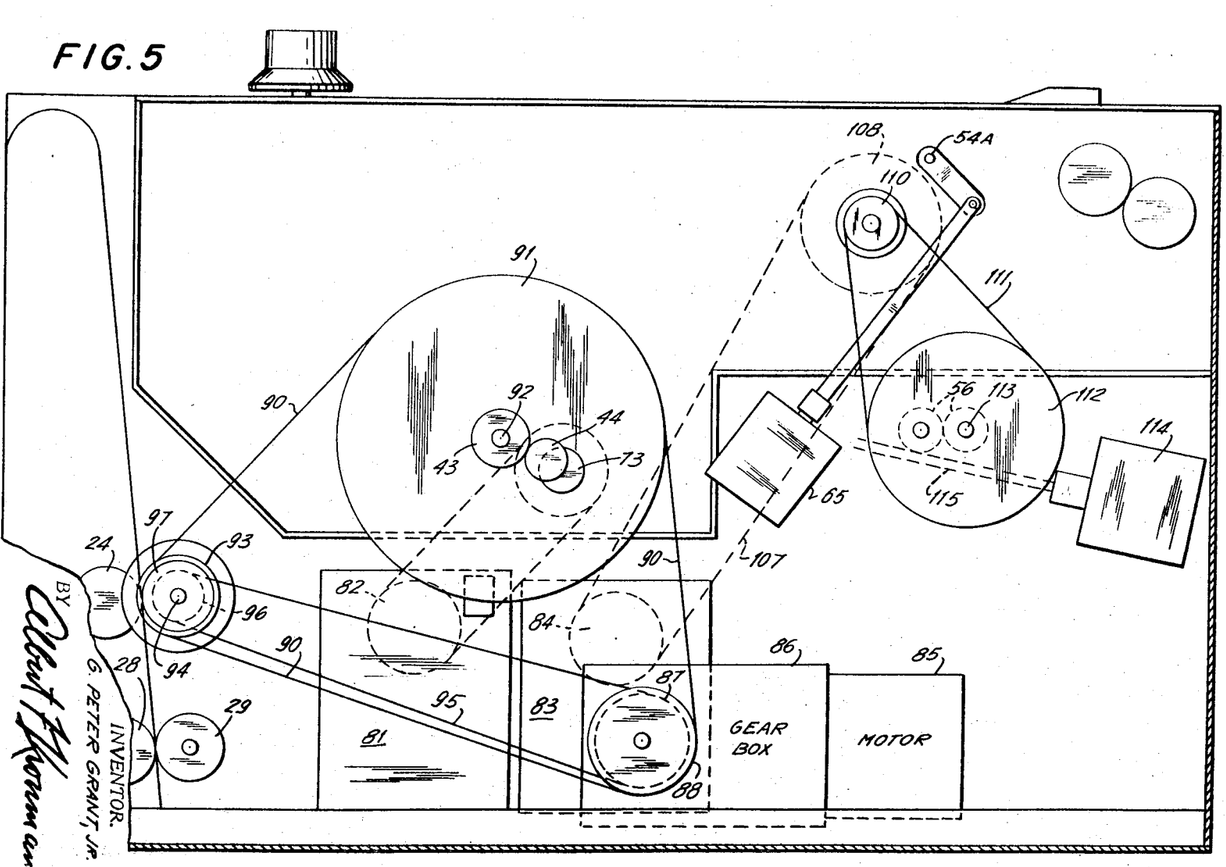
FIGURE 5 is a cross-sectional view of the machine taken along line 5—5 of FIGURE 4, just inside the right hand cover. This view shows the three motors, five belt drives, and two solenoids.

Referring now to FIGURES 3, 4 and 5, the entrance slot 11 is bounded at each side by partitions 20 and 21, and this slot extends vertically past rollers 22 and 23 which direct the document into an object plane. Rollers 24 and 25 push the document to a position between two flat transparent plates 26 and 27, defining an image plane where the documents are photographed. Rollers 28 and 29 move the document to an exit position at the bottom of the cabinet. While the document is in the image plane, between the plates 26 and 27, series of lamps 30 provide the light for illuminating the document so that it may be photographed.

The light from the document is reflected to a first front surface mirror 31, and then through a principle lens 32 which is mounted on a pivot 33 so that it may be moved to accommodate other optical systems. After the light leaves lens 32, it is focused onto a piece of sensitized paper 34 which came from a roll 35. The sensitized paper is conveniently packaged in a daylight safe container 36 having an exit slot 37. Container 36 is dropped into the machine by lifting a lid 38 and, at the same time, a length of paper 34 is unwound from the roll and pushed into slot 40. Slot 40 is formed by two curved metal sheets 41 and 42, the exit portion of this slot ending adjacent to two driven rollers 43 and 44. The paper 34 moves at a definite speed provided by the rollers 43 and 44 at the same time as the document is moved downwardly by power rollers 25 and 29. As is well known, the ratio of speeds is proportional to the ratio of the reduction of the object to the image and in this type of system, only a thin line of image area is necessary for reproduction.

After leaving the exposure area, the exposed paper is directed into a second slot 45 defined by curved plates 46 and 47. The paper now enters a developing and fixing compartment 48 where the image is first developed by chemical means and then fixed by a second chemical solution. The usual type of developing and fixing solution may be used but the invention is not limited to any specific chemical formulas. In the embodiment shown in FIGURE 3, the developing solution 50 is at the bottom of the first portion of compartment 48 while the fixing solution 50 is in the second portion 49. The paper moves between two sets of driven rolls 52, the bottom rolls picking up the solution 50 and applying it to the sensitized portion of the paper without the necessity of immersing the entire sheet. The sheet now moves to rollers 53 where the fixing solution 51 is applied in the same manner. After leaving rollers 53, the paper is diverted downwardly by a deflector 54 into a slot 55, unless the deflector is rotated out of its path. It should be noted that the developed and fixed reproduction is a negative image of the document. In order to make microtape, the small negative continues to move along slot 74 through fixing solution 51 and between rollers 75 to exit slot 76. To make a positive print of the same size as the original document, the small negative is directed downwardly by deflector 54 into slot 55 and then through two driven rollers 56 and another slot 57. A portion of slot 57 is cut away so that light from a lamp 58 can illuminate the negative print as it passes through slot 57 and is finally directed by a deflector plate 60 so that it drops into a large hopper 61. As will be explained later, when the operation is discussed, after each exposure has been made, a knife 62 is operated to cut off the exposed paper. The timing of this knife actuation depends upon the length of the document and the length of the exposed paper. For this reason, a setting must be made by the adjustment of knob 12, so that the solenoid which operates knife 62 is actuated at the right time.

When the negative print passes through slot 57, light from lens 32, as indicated by line 63, and then strikes mirror 64 which directs the light upwardly to mirror 65, and then to a longer mirror 66. The plan view showing these mirrors is part of FIGURE 4, which also shows the rollers in the developing and fixing tank and the deflector 54. The light from mirror 66 is reflected horizontally as indicated by line 67 onto a second sheet of sensitized paper 68 which is directed by two curved sheets forming a slot 70. It should be noted that there are two rolls of sensitized paper underneath lid 38.

One roll 35 is narrow and is used for making the negative prints and microtape. The position of this roll 35 is shown in FIGURE 4. The second roll 71 is also shown in FIGURE 4, and contains a roll of paper 8½ inches wide. The two slots which handle and direct the paper from these rolls are positioned in substantially the same cross-sectional position as indicated in FIGURE 3. Paper 68 from roll 71 is moved by a second pair of rollers 72 and 73 similar to rollers 43 and 44. Slot 70 directs the wide sensitized paper through the developing and fixing cabinet 48 where it is processed in the same manner as was paper 34. However, when the paper leaves rolls 53, the paper passes into slot 74 formed by a series of wires and out through rollers 75 to exit slot 76 where it may be picked up by the operator.

FIGURE 3 also shows a solenoid 77 which moves lens 32 when it is to be used in another optical system. A second solenoid 121 is shown in this figure, the purpose of which will be described later. Also, another mirror 80 is shown to the right of mirror 31 and is used to reflect the light from a document through lens 32 when mirror 31 has been moved out of the way by the actuation of solenoid 77. The extent of this additional optical path will be described later.

Five motors are employed in the cabinet. One motor 81 turns a pulley 82 which operates paper rollers 72 and 73. A second motor 83 turns pulley 84 which operates the rollers in the developing and fixing tanks 50 and 49. Pulley 84 is also coupled to rollers 56, driven by pulley 112.

Figure 6:
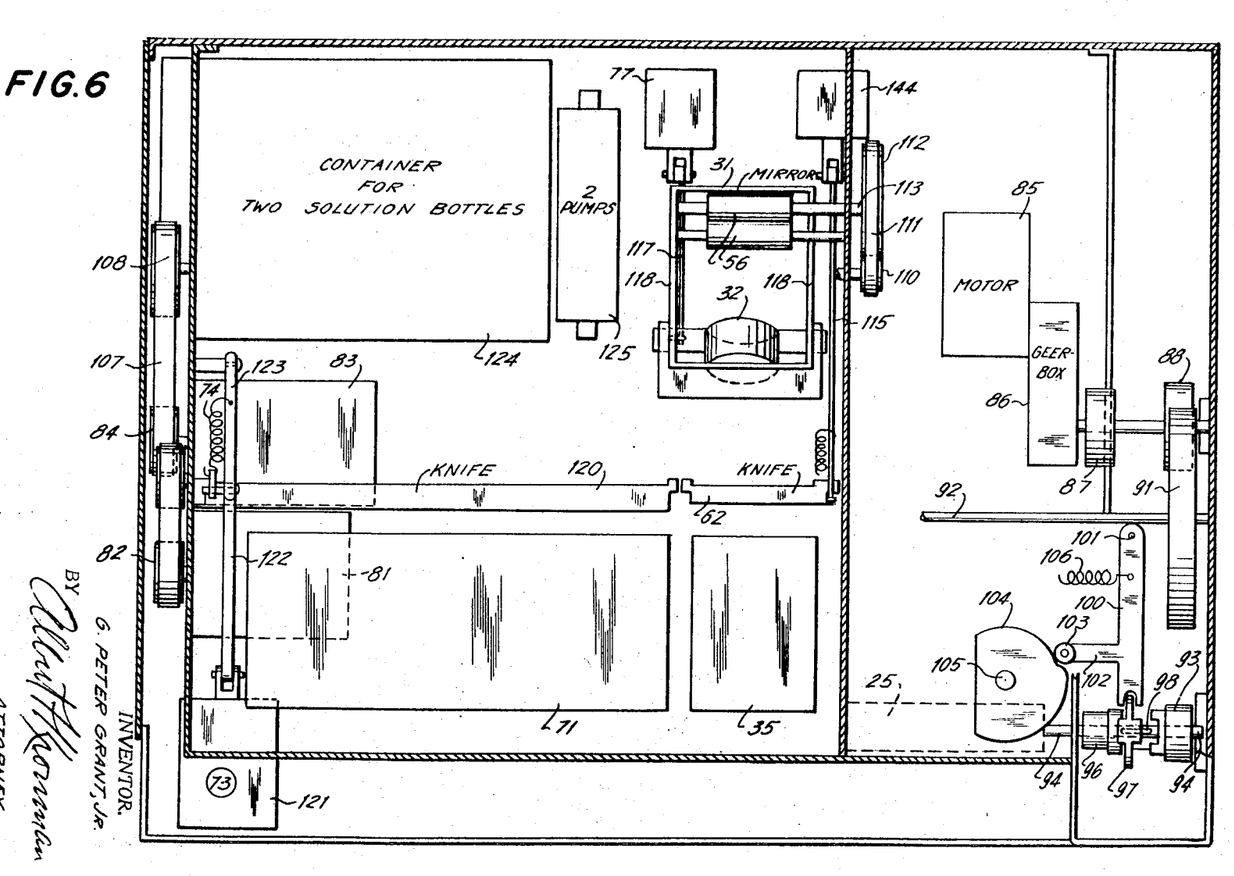
FIGURE 6 is a cross-sectional view taken along a horizontal plane, similar to FIGURE 4, but showing the motor drives and the main lens.

Referring now to FIGURES 5 and 6, motors 81 and 83 are shown with their coupling belts to indicate which rollers they operate. Also, a third motor 85 is shown coupled through a gear box 86 to two pulleys 87, 88. Pulley 88 is coupled to a belt 90 which turns a large pulley 91 coupled to a shaft 92 on which is secured roller 43. This shaft 92 turns slowly and moves paper 34 through the image plane to record a reduced size image. Belt 90 also turns a pulley 93 which is normally free on a shaft 94 secured to roller 25. The other pulley 87 is smaller than pulley 88 and runs a belt 95 coupled to a second free-running pulley 96 on shaft 94. Pulleys 93 and 96 are coupled to shaft 94 by a clutch 97 (see FIGURE 6) coupled to shaft 94 by a pin and slot 98 and controlled by a lever 100. Lever 100 is pivoted to a portion of the cabinet by pivot 101 and is moved by means of an extension 102 bearing a cam follower 103. Lever 100 is moved by cam 104, controlled by shaft 105 and knob 12.

When knob 12 is turned to "Microtape On," cam 104 is rotated to permit a spring 106 to pull lever 100 and clutch 97 into engagement with pulley 96, thereby turning shaft 94 and document roller 25 at the proper speed for the desired ratio of reduction. When knob 12 is turned to another setting to make larger sized prints, cam 104 moves clutch 97 to engage pulley 93 and then shaft 94 and roller 25 are given a second desired speed for the larger sized negatives.

Pulley 84, run by motor 83, is coupled to a belt 107, and a larger pulley 108 secured to roller 53 in the processing tank 48. Pulley 108 is also coupled to a smaller pulley 110 which moves belt 111 and a large pulley 112. Pulley 112 is secured to shaft 113 and rollers 56 (see FIGURE 3) which move the developed and fixed paper into slot 57 and through the object plane when negative prints are being copied.

FIG. 6 also indicates the respective width of the narrow paper from roll 35 and the wider paper from roll 71. The knife 62 which cuts off the paper from the narrow roll is shown adjacent to the roll, and is operated by a solenoid 114 coupled by means of a rod 115 to the knife 62. A spring 116 normalizes the solenoid and the knife when the solenoid is not activated. Also shown in FIGURE 6, is solenoid 77 which operates a rod 117 to shift the lens 32 toward the paper strip 34 and to lower mirror 31 which is secured to the lens support by means of two flat supports 118. When solenoid 77 is operated, mirror 31 is moved to the position 31A and light reflected by it cannot move through lens 32. However, mirror 80 can now send reflected light from a document in the object plane through lens 32 thereby providing a much longer path and reducing the size ratio by a substantial amount. Mirror 31 is moved to its indicated position when the compact copies or smaller sized negatives are to be made, the copies occupy substantially one-half the area of the original documents.

The sensitized paper 68 from wide roll container 71 moves through the jaws of a paper knife 120, positioned in line with knife 62 (FIGURE 6). This knife 120 is operated by a solenoid 121 coupled to the knife by rods 122 and 123. The operation of these solenoids will be described later.

Figure 7:
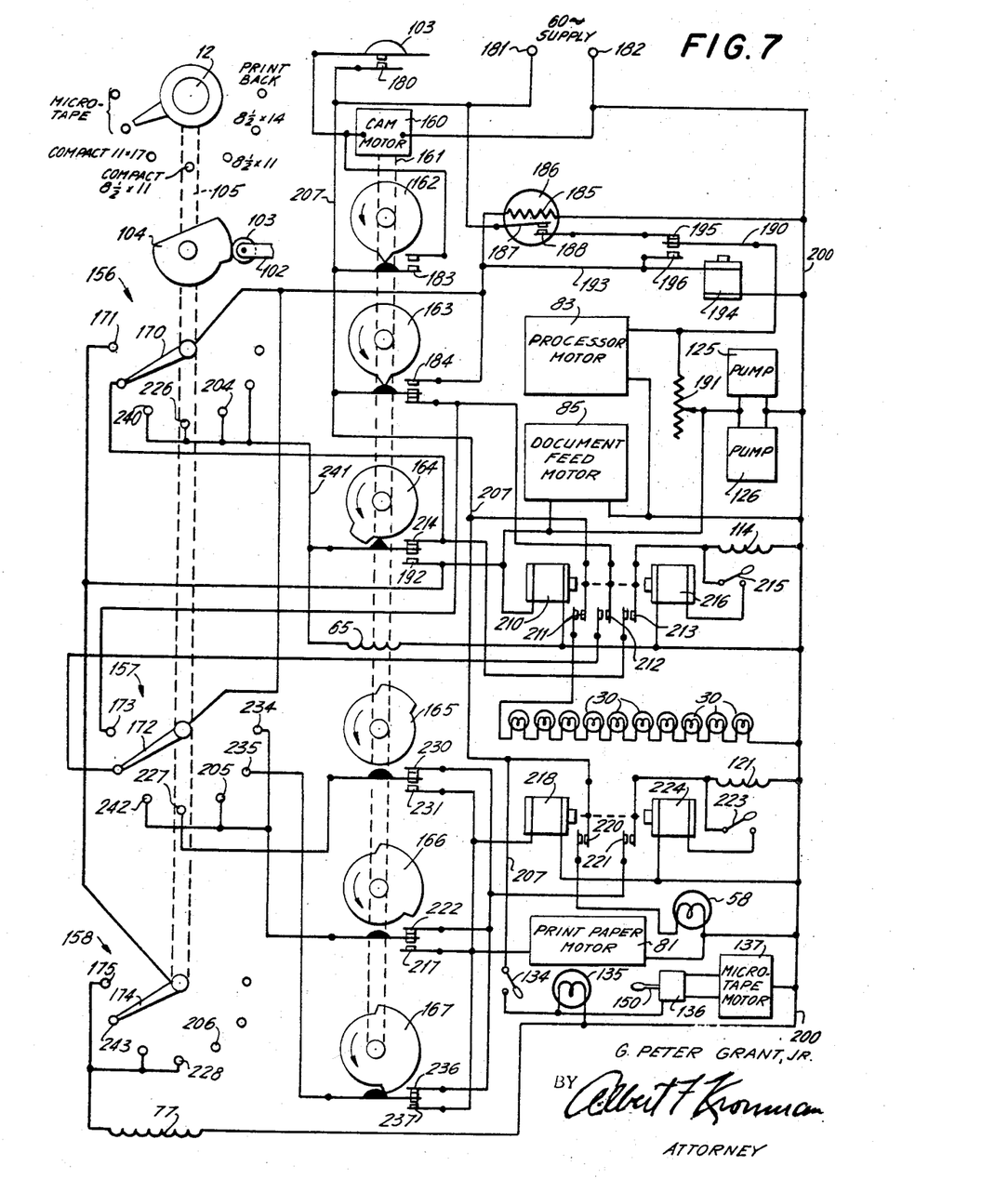
FIGURE 7 is a wiring diagram showing all the electrical components and their connections.

Below the developing and fixing compartment 48 is a container 124 for two solution bottles, one for developer solution, and the other for fixing solution. The solutions are pumped into compartment 48 by two pumps 125 and 126, mounted one above the other. The position of these pumps is indicated only in FIGURE 6, and their electrical connections are shown in FIGURE 7.

Figure 8:
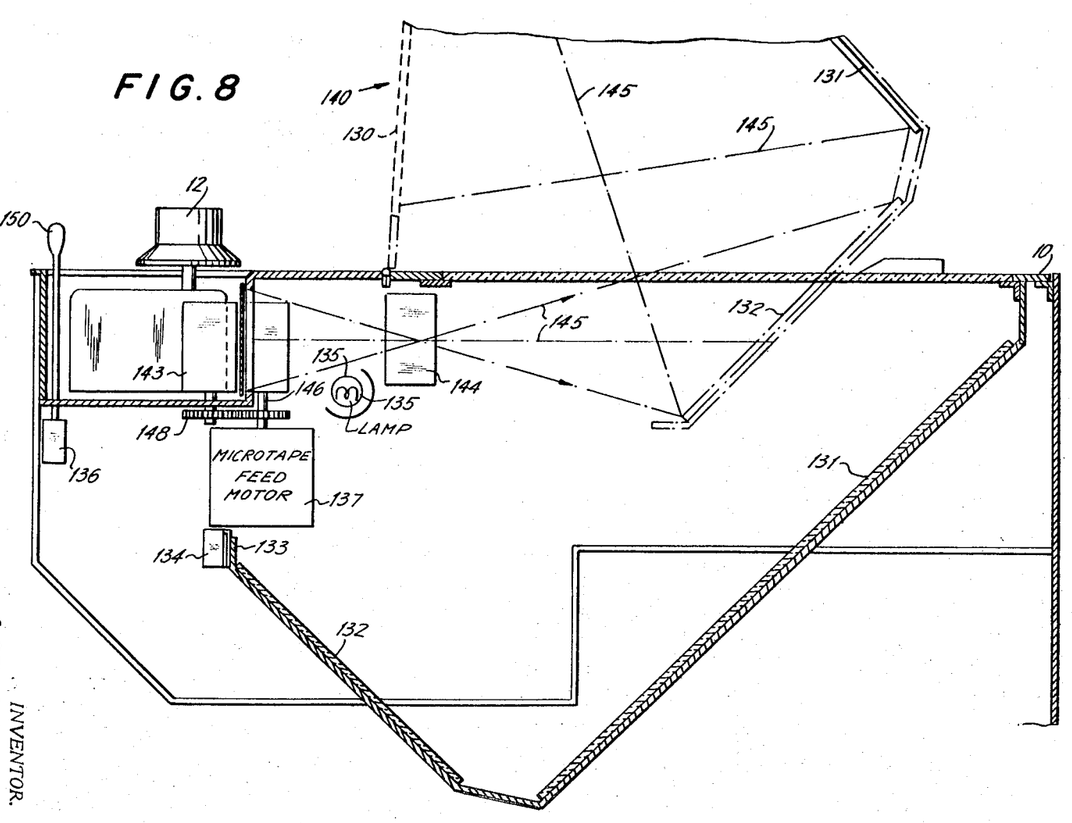
FIGURE 8 is a side view of the projection screen, the projection lens, and the two mirrors which provide an image when the projection screen is raised to a viewing position.

FIGURE 8 shows a projection screen 130 when it is in its lowered position and when it is raised for viewing purposes. The projection screen is used only for viewing microtape images. When in its lowered position, the screen 130 is flush with the top of the cabinet 10. Two mirrors 131 and 132 are secured to brackets which retain the mirrors in a fixed position with relation to the screen. A portion of the bracket 133 engages a switch 134 when in the lowered position to cut off power to a lamp 135, a switch 136, and a reversible motor 137. The projection screen and bracket are secured to a hinge 138 which permits the entire arrangement to be moved up to the position 140 shown in broken lines in FIGURE 8. In this position, light from lamp 135, illuminates tape 141 held between rollers 142 and 143. The reflected light is focused by lens 144 and then is projected, first to mirror 132 and then to mirror 131 and finally to the viewing screen 130 where it is observed by the operator. The light beam from the paper 141 through lens 144 to screen 130 is defined by the broken lines 145.

The microtape feed motor 137 is coupled to shaft 146, roller 142 and a gear 147. Gear 147 meshes with another gear 148 of the same size which turns roller 143. The microtape motor 137 is reversible and is controlled by switch 136 which also contains two resistors for changing the speed of the motor while it is running in either direction. Switch 136 is controlled by a lever 150 which extends above the top panel of the cabinet 10 and is available to the operator. The operation of this portion of the machine is not connected with other components. With the projection screen 130 raised to position 140, the operator inserts a microtape 141 between rollers 142 and 143 and then moves lever 150 to the right or left to move the tape through the object plane. It is proposed to identify each image on the roll of microtape by the use of lines between frame images. These lines may be seen by the operator when the film is moving rapidly through the object plane. The operator continues the rapid motion of the tape until the indicator line shows that a desired frame will soon pass through the object plane. At this point lever 150 is adjusted so that the tape moves slowly and the operator can inspect each frame. When the desired frame is in view, the operator stops the motor and inspects the image. If the tape is moved past the desired frame or for any other reason the operator may reverse the direction of the motor and reverse the movement of the tape. The circuit involving the motor 137, the lamp 135, the limit switch 134 and the control switch 136 will be discussed later.

The operation of the machine will now be described with particular reference to the wiring diagram of connections shown in FIGURE 7. In this figure the control knob 12 is coupled to a shaft 105 and three selector switches 156, 157 and 158. Also a cam motor 160 is coupled to a shaft 161 and six cams, 162, 163, 164, 165, 166 and 167, these cams are set to revolve in the direction indicated at a speed of about one revolution every ten seconds. The cams open and close contacts which, in conjunction with five relays and the solenoids previously described, make the operation fully automatic.

Control knob 12 is generally turned to the OFF position when the machine is not in use. When it is desired to make copies on a microtape, the knob is turned to the microtape ON position, thereby turning arm 170 to make contact with terminal 171. In like manner, arm 172 is turned to contact 173 and arm 174 makes contact with terminal 175. In this position cam 104 (FIGURE 6) is rotated so that the clutch 97 engages pulley 96 to turn shaft 94 and roller 25 at a desired speed. As explained previously, the ratio of distances between the object space in slot 11 to the lens is much larger than the distance between the lens and the paper strip 34 so that a very small image of the document is printed on the paper. After the knob 12 has been set, start button 13 is depressed, thereby closing contacts 180 and applying alternating current power from terminals 181 and 182 to the cam motor 160. This starts the motor and turns all the cams secured to shaft 161. As soon as cam 162 has turned a few degrees, contacts 183 are closed and button 13 may be released. Contacts 183 are in parallel with contacts 180 and the current from the power supply continues to operate the cam motor 160 until a full revolution of cam 162, at which time contacts 183 are opened and this first operation is finished.

Every operation of the printing machine requires the operation of the processor motor 83. Because of this, the second cam 163 closes contacts 184 and applies current to conductor 193 and relay winding 194 causing it to attract armature 190, opening contacts 195 and closing contacts 196. This action applies current from contacts 184 to the processor motor 83 and to pumps 125 and 126, returning to conductor 200 and terminal 182. These pumps pump the solutions from the storage bottles in container 124 (FIGURE 6) to the developing and fixing enclosure 48.

A resistor 191 is connected in series with the pumps so that they normally run at a comparatively low speed. However, at the start of each operation, it is desirable to run the pumps faster to make sure that fresh developer and fresh fixing solution are in the tanks. Cam 164 closes contacts 192 and thereby short circuits inductor 191 for about one second so that the pumps start off at high speed and as soon as cam 164 opens contacts 192 the pumps slow down to their normal speed.

When contacts 184 close, current also flows through resistor 185 in delay relay 186. As soon as the resistor heats up, a bimetallic strip 187 is bent and contacts 188 are closed. This action may take several seconds, but during this time contacts 196 are closed and the processor motor 83 and pumps 125 and 126 receive power. After the cam motor 160 has made a complete revolution and contacts 184 are opened, relay 184 is normalized and armature 190 returns to its normal position closing contacts 195. However, contacts 188 are closed and they will remain closed until the heater 185 in the delay relay 186 cools off. This delay keeps the processor motor turning for about 10 seconds after the main cycle has been completed and assures that any long piece of paper will be completely processed through the developing and fixing solutions. The pumps 125 and 126 are also provided with power for this additional period.

Figures 10, 11:
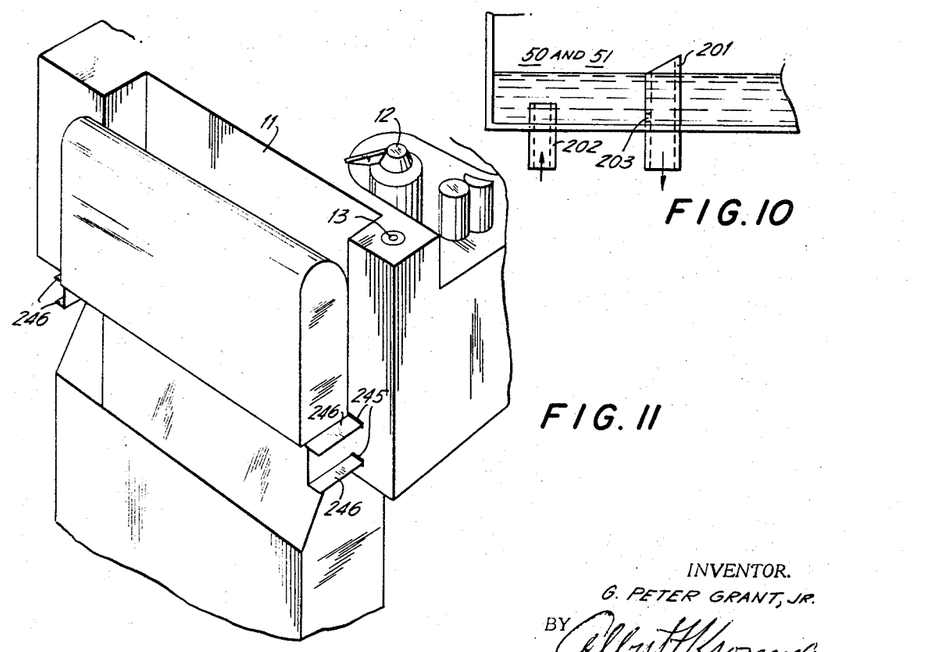
FIGURE 10 is a fragmentary view showing the tray overflow pipes according to the present invention.
FIGURE 11 is a somewhat isometric fragmentary view of the book copying mechanism according to the present invention.

Pumps 125 and 126 pump their solutions into trays 50 and 51. Each tray is provided with an overflow pipe 201 as shown in detail in FIGURE 10. The input pipe 202 is connected to one of the pumps and, when the pumps are running keeps the solution at the proper level. When the pumps stop, the solution slowly returns to the bottle by leaking through a small hole 203 in the return tube near the bottom of the tray. At the start of each cycle, the higher speed of the pumps assures that the trays will be filled before the sensitized paper arrives.

To clarify the making of microtape, of compact 8½ x 11, and of compact 11 x 17 negative images, it should be pointed out that in these operations the original documents are always inserted sideways in slot 11 and their negative images are printed with their length across the 8½" width of print paper.

Now let it be assumed that an 8½ x 11 full sized copy is desired. The operator inserts the 8½ x 11 document into slot 11 and sets knob 12 at 8½ x 11, thereby moving arms 170, 172 and 174 to make contact respectively with terminals 204, 205 and 206. Then the operator presses the start button 13 a moment and motor 160 starts turning the cams and closing the contacts under the cams. The process motor 83 and pumps are started as described above. As soon as motor 160 starts, cam 164 closes contacts 192, thereby supplying the document feed motor 85 with current and causing it to roll the document through the feed rollers. The circuit which applies this power may be traced from terminal 181, over conductor 207, through contacts 184, to arm 170, and contact 204, then through contacts 192, the document feed motor 85, and conductor 200 to the other power terminal 182. It will be noted that cam 164, which closes contacts 192, operates the contacts for a short time only, for about two seconds, long enough to move this sized document through the machine. At the same time, a short piece of sensitized paper 34 is moved through rollers 43, 44, and the exposure is made as described above, the optical path following broken lines 208 and reflected from mirror 31.

A latching relay 210, actuated by current through contacts 192, has now closed all three of its contacts, 211, 212 and 213. Current from conductor 207 flows through contacts 211 to light all the lamps 30 which are arranged along the object plane as shown in FIGURE 3. After about two seconds cam 164 opens contacts 192 and closes contacts 214. This action sends current from conductor 207 through contacts 214 and relay contacts 213 to activate solenoid 114 and operate knife 62 to cut off the exposed strip of sensitized paper and permit it to pass through the processing trays 50 and 51. The end of the stroke of knife 62 closes a limit switch 215, switching current to a release winding 216, and opening all three contacts 211, 212 and 213.

Still another circuit is completed when contacts 184 are closed. This circuit may be traced from conductor 207, through contacts 184, arm 170, contact 204, solenoid 65, to conductor 200. Solenoid 65 operated deflector 54 to divert the developed and fixed paper through slot 55 to object plane in slot 57. Lamp 58 now illuminates the negative strip in slot 57 and light from this strip is focussed by lens 32 onto the wide paper from roll 71 in the following manner.

Cams 165, 166 and 167 all operate their contacts at the same time, but each releases its contacts at the end of a different time interval. Cam 165 closes contacts 217 long enough to permit motor 81 to move about 11 inches of paper 68 from roll 71 to pass through the image plane of lens 32 and expose the paper 68 to light from paper 34, passing through slot 57. During this time latching relay winding 218 receives current from contacts 217 closing contacts 220 and 221. Current through contacts 220 lights lamp 58 to illuminate the negative in slot 57. No current passes contacts 221 until cam 166 opens contacts 217 and closes contacts 222, at the end of the negative exposure time. When contacts 222 close, current is sent through contacts 221 to solenoid 121, causing it to be activated and to operate paper knife 120 to cut off the 8½" wide paper. A limit switch 223 is operated by knife 120 at the end of its travel and this switch applies current to an unlatch relay winding 224 and open contacts 220 and 221.

The 8½" wide exposed paper now moves through the developing and fixing solutions 50 and 51 and, when discharged from rollers 53, passes to slot 74 in the fixing solution and to driven rollers 75 to be ejected at exit slot 76 where the operator may pick it up.

When the selector knob 12 is set at 8½ x 11, compact arms 170, 172 and 174 are connected respectively to contacts 226, 227 and 228. The starting procedures are the same and current through contacts 192 flows through arm 174, contact 228 and solenoid 77 to move rod 117, and the main lens 32 closer to the sensitized paper 34. The 8½ x 11 document is fed sideways into slot 11. The movement of the document and the narrow paper is the same but since the lens is closer to the tape, the image is smaller. Also, as described above, actuation by solenoid 77 lowers mirror 31 to position 31A and only light reflected from mirror 80 passes through the lens. The new lens position and the increased travel of light from the document to the lens keeps the image in focus.

When the knob 12 is set at 8½ x 11, compact, the cam 104 (FIGURE 6) is moved so that arm 100 engages clutch plate 97 and pulley 96, thereby changing the speed of rollers 25 and 24 to compensate for the change in size and move the document faster.

Current through contacts 227 activates contacts 230 and 231 under cam 165. When the narrow strip containing the small image passes through slot 57, current from contact 231 allows motor 81 to run for a shorter time, moving a shorter length at 8½" wide paper before contact 231 opens. Contact 230 closes and operates paper knife 120 and relay release coil 224.

When the knob 12 is turned to Print-Back, arm 170 is on a blank contact and no current is supplied to the Document Feed Motor 85 and it does not move during the entire cycle. Arm 172 rests on contact 234 and rotating cam 166 controls the action. Motor 81 is activated long enough to move 11 inches of paper from roll 71 before knife 120 cuts it off. In this operation, the operator views the desired image on a microtape roll (by viewing on the projector) and cuts the tape next to the desired image. The end of the tape containing the desired image is then fed into slot 15 (FIGURE 3) as far as it can be pushed. It drops to meet rollers 56. The start button 13 is depressed and the machine lights lamp 58, as before, when contacts 217 close and relay 228 is activated. The processor motor 83 and the pumps are run as described above. The tape is pulled back out after the printing operation. This is made possible by driving only one roller 56 by shaft 113. The other roller is lightly stressed by a weak spring.

When the selector knob 12 is set at 8½ x 14, the same sequence of events is produced except that as, 172 is set on contact 235 and the cam 167 controls the timing by operating contacts 236 and 237. It is obvious from the extent of the cam face that contacts 237 will be kept closed longer and motor 81 can run more sensitized paper through the image plane.

The compact 11 x 17" operation is for reducing 11 x 17 documents to 71% of their linear dimensions or one-half their area. As can be seen from the wiring diagram in FIGURE 7, arm 170 makes contact with point 240 which is connected to the same conductor 241, as three other contact points on this switching stage. Cam 164 controls the timing and energizes the document feed motor 85 to run the document through slot 11. As in the compact 8½ x 11 exposure, the 11 x 17 sheet is put in sideways so that the feed requires only an 11 inch length. Arm 172 makes contact with point 242 and cam 166 controls the timing of the 8½ wide print paper 68. Arm 174 makes contact with point 243 and energizes solenoid 77 to move the lens 32 closer to the paper and drop mirror 31 out of line with the lens. This is the same action as was taken when the 8½ x 11 compact prints were made.

Slot 11, where the documents are entered is defined by a back plate 20 and a guide plate 21. Plate 21 is secured to a removable member which includes idler rollers 22, 24 and 28, in addition to a transparent glass plate 26. This entire member can be pulled away from the machine by an operator when a book, pamphlet, or thick object is to be reproduced. Slots 245 (FIGURES 1, 11) accommodate two horizontal plates 246 on each side of the removable member and permit its removal. When a book or magazine is to be photographed, the bottom edge of the part desired is inserted into the enlarged slot 11 down to roller 25 which is power driven. Then, when the button 13 is depressed, the operator guides the book down under traction by the roller. The other operations of the machine have been described.

Figure 9:
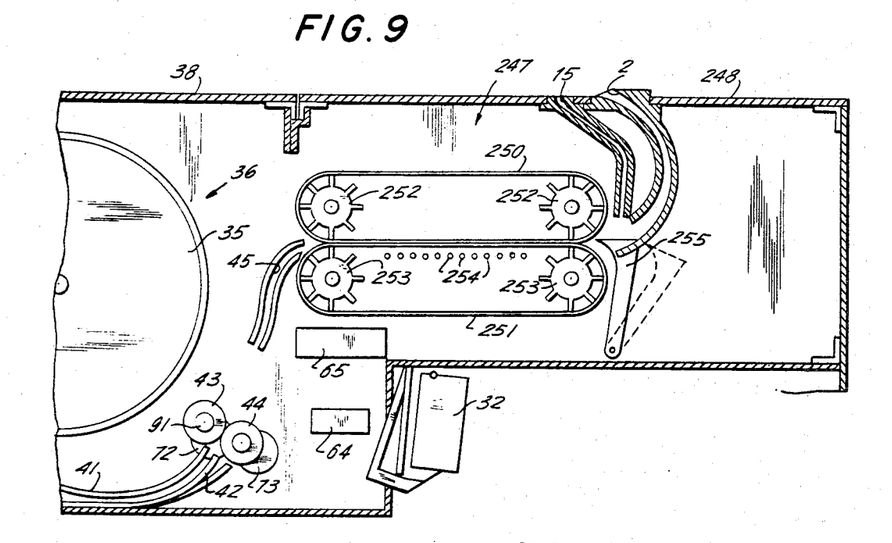
FIGURE 9 is a cross-sectional view similar to FIGURE 3, but showing a developing and fixing process which uses thermal sensitive paper.

The developing and fixing compartments 48, together with deflector 54 and rollers 75 can be removed from the machine by removing a belt and one coupling bar and then lifting part of the top compartment. An alternate fixing engagement 247, shown in FIGURE 9, secured to another lid 248, can be dropped into place and other belts and coupling bars put in place. The alternate fixing means 247 includes two endless belts 250 and 251, turning on finned rollers 252 and 253. Adjacent to one of the belts surfaces is a series of heater wires 254 which raise the temperature of the belts to a value which is sufficient to fix heat-processed sensitized paper. Slots 45 and 70, direct paper from roll 35 to a position where the belts pick it up. A deflector 255, operated by the same solenoid 65, which operates deflector 54, moves the small tape through rollers 56 (see FIGURE 3) and when microtape is being made, moves out of the way and the paper is moved through slot 256 where the operator can remove it. All other components and operations are the same as described above.

It will be evident from the above description and the appended drawings that the machine automatically photographs a document of various sizes, produces positive prints of the document in several sizes and also provides a means for projecting images of microtape onto a viewing screen. The total time of each operation is ten seconds or less.

Having thus fully described the invention, what is claimed as new and desired to be secured by Letters Patent of the United States, is:

1. A photographic document copying device for producing positive copies comprising, a first transparent supporting means for positioning a document in a first object plane, a plurality of first lamps arranged adjacent to said supporting means for illuminating the document as it passes therethrough, a first sensitized flexible strip mounted for movement through a first image plane, a lens and a mirror for focusing the light from a document in the supporting means onto the first sensitized strip in the first image plane to produce a non-reversed image thereon, a developing and fixing means for sequential operation on the first strip to produce a negative copy of the document, roller means for moving the document through the first supporting means and for moving the first strip through the first image plane, additional roller means for moving the first strip through the developing and fixing means, a second supporting means for positioning said first strip in a second object plane after being developed and fixed, a second lamp adjacent to the second supporting means for illuminating the first strip as it passes therethrough, a second sensitized flexible strip mounted for movement through a second image plane coplanar with the first image plane, optical means for focusing the light from the first strip in the second object plane onto the second strip in the second image plane, said optical means including said lens and three mirrors, and roller means for moving the second strip through the second image plane and through the developing and fixing means to produce a positive copy.

2. A photographic document copying device for producing positive copies comprising, a light-tight cabinet for housing a plurality of exposing and developing components, said cabinet including a base portion and a movable wall portion, said movable portion stressed by resilient means to move toward the base, a first series of driven rollers and a first transparent sheet secured to said base, a second series of idler rollers and a second transparent sheet secured to the movable portion, said first and second series of rollers defining an entrance slot where documents of varying thicknesses can be entered for copying, said first and second transparent sheets defining a first object plane, a plurality of first lamps positioned adjacent to said first transparent sheet for illuminating the document as it passes through the first object plane, a first sensitized flexible strip mounted for movement through a first image plane, a lens and a mirror for focusing the light from a document in the first object plane onto the first sensitized strip in the first image plane, a developing and fixing means for sequential operation on the first strip to produce a negative copy of the document with a non-reversed image, roller means for moving the first strip through the first image plane, additional roller means for moving the first strip through the developing and fixing means, a second supporting means for positioning said first strip in a second object plane after being developed and fixed, a second lamp adjacent to the second supporting means for illuminating the first strip as it passes therethrough, a second sensitized flexible strip mounted for movement through a second image plane coplanar with the first image plane, optical means for focusing the light from the first strip in the second object plane onto the second strip in the second image plane, said optical means including said lens and three mirrors, and roller means for moving the second strip through the second image plane and through the developing and fixing means to produce a positive copy.

3. A photographic document copying device for producing positive copies comprising, a first transparent supporting means for positioning a document to be copied in a first object plane, a plurality of first lamps positioned adjacent to said supporting means for illuminating the document as it passes therethrough, a first sensitized flexible strip mounted for movement through a first image plane, a lens and a first mirror for focusing the light from a document in the object plane onto the first sensitized strip in the first image plane to produce an image having a first predetermined ratio of area reduction, a developing and fixing means for sequential operation on the first strip to produce a negative copy of the document, roller means for moving a document through the first supporting means and for moving the first strip through the first image plane, a second supporting means for positioning said first strip in a second object plane after being developed and fixed, a second lamp adjacent the second supporting means for illuminating the first strip as it passes therethrough, a second sensitized flexible strip mounted for movement through a second image plane coplanar with the first image plane, optical means for focusing the light from the first strip in the second object plane onto the second strip in the second image plane, said optical means including said lens and three mirrors, and an optical shifting means under control of a solenoid and an electric circuit for moving the lens closer to the first image plane and at the same time moving the mirror away from the optical axis to permit the light from the document to be reflected by a second mirror and thereby produce an image having a second predetermined ratio of area reduction.

4. A copying device as claimed in claim 3 wherein a manual control means is coupled to said lens shifting means and wherein a clutch is coupled to the manual control means for shifting from one set of roller pulleys to a second set and thereby altering the speed of the document as it passes through the first object plane.

5. A copying device as claimed in claim 3 wherein a first electric motor is coupled to the roller means for moving the document, said first motor also coupled to a roller means for moving the first strip through the first image plane, said first motor connected to pulleys and a belt for driving the rollers at speeds corresponding to a predetermined linear ratio of size reduction.

6. A copying device as claimed in claim 3 wherein a second electric motor is coupled to roller means for moving said first strip through a second object plane after being developed and fixed, a third electric motor coupled to a roller means for moving the second strip through a second image plane, said second and third motors connected to their pulleys and belts for driving the roller means at speeds corresponding to predetermined linear ratio of size enlargement.

7. A copying device as claimed in claim 3, wherein a second entrance slot is provided for entering documents of reduced size into said second object plane whenever an enlarged print is desired, said second entrance slot mounted above said developing and fixing means.

8. A copying device as claimed in claim 3, wherein a plurality of shearing knives are positioned respectively adjoining said first and second sensitized paper strips for cutting the strips at the end of an exposure operation, a solenoid for each knife, each solenoid having a plunger coupled to its knife for operating the knife whenever the solenoid is supplied with electrical power.

9. A photographic document copying device for producing positive copies comprising, a means for positioning a document to be copied in a first object plane, a first source of illumination for the document as it passes through the first object plane, a first sensitized flexible strip mounted on a roll and arranged for movement through a first image plane, a first mirror and a lens for focusing the light from a document in the object plane onto the first sensitized strip in the image plane to produce an image having a first predetermined ratio of area reduction, a developing and fixing means for sequential operation on the first strip to produce a negative copy of the document, a first roller means actuated by a first motor for moving the document through the first object plane and for moving the first strip through the first image plane, a means for positioning said first strip in a second object plane after being developed and fixed, a second source of illumination for the first strip as it passes through the second object plane, a second roller means actuated by a second motor for moving the first strip through the second object plane, an optical system for focusing the light from the first strip in the second object plane onto a second strip of sensitized paper in a second image plane coplanar with the first image plane, a second mirror displaced from the first mirror, and an optical shifting means coupled to a plunger in a selenoid for moving the lens closer to the first image plane by rocking a lens support and at the same time rocking the first mirror away from the optical axis to permit the light from the document to be reflected by said second mirror and thereby produce an image having a second predetermined ratio area reduction.

10. A photographic document copying device comprising, an electric document motor coupled to a first set of rollers for moving a document through a first object plane and coupled to a second set of rollers for moving a first sensitized paper sheet through a first image plane, an electric processing motor also coupled to a set of processing rollers for moving exposed sensitized paper through a developing and fixing means, said processing motor also coupled to a set of negative print rollers for moving the developed and fixed papers through a second object plane, an electric positive print motor for moving the positive sensitized sheet through a second image plane, a cam motor for turning a cam shaft one revolution during a copying operation, said cam motor coupled to a plurality of cams for opening and closing contacts in series with a pair of power terminals and the document, the processing motor, and the print paper motor in a predetermined sequence during the copying operation, and a plurality of print paper cams coupled to said cam motor, each of said cams including an extended cam face which closes a pair of contacts connected in series with a source of electric power and the positive print motor for providing time intervals of varying duration for moving varying lengths of sensitized paper through the second image plane to accommodate documents of varying lengths.

11. A copying device as claimed in claim 10, wherein said developing and fixing means is replaced by an alternate developing means, said means including two sets of rollers, a pair of endless belts on the rollers for moving a strip of temperature-sensitive paper through a developing space, and a source of heat within the and adjacent to the belts for developing a latent image on the strip.

12. A copying device as claimed in claim 11, wherein said belts are positioned adjacent to the first image plane to pick up and move a first strip after it passes through the first image plane, and to deliver the developed strip to said second object plane.

13. A copying device as claimed in claim 11, wherein said rollers are coupled to said processor motor and controlled for movement by a processor cam and electric contacts actuated by the cam.

References Cited
UNITED STATES PATENTS

| | | | |
|---|---|---|---|
| 3,242,842 | 3/1966 | Jones | 95—89 |
| 3,250,202 | 5/1966 | Gold et al. | 95—89 |
| 3,299,793 | 1/1967 | Lowry | 95—89 X |

NORTON ANSHER, *Primary Examiner.*

RICHARD A. WINTERCORN, *Assistant Examiner.*